UNITED STATES PATENT OFFICE.

ERNST FRANZ WILHELM HIRSCH, OF RADEBURG, SAXONY, GERMANY.

OPAQUE OR SEMI-TRANSPARENT ENAMELED GLASS OR COLORED GLASS.

SPECIFICATION forming part of Letters Patent No. 303,009, dated August 5, 1884.

Application filed June 24, 1884. (Specimens.)

*To all whom it may concern:*

Be it known that I, ERNST FRANZ WILHELM HIRSCH, of Radeburg, Kingdom of Saxony, Germany, have invented an improvement in opaque or semi-transparent enameled glass or colored glass globes and shades for gas, petroleum, or other flames or lights, of which the following is a specification.

Hitherto in manufacturing lamp globes and shades of enameled glass (also called milk-glass) it has been the main object in view to make these shades and globes in such a manner that the light of the flame was dispersed by the surrounding glass, the body of the flame itself remaining invisible within such globes and behind such shades. In order to attain this invisibility of the flame, the enameled or milk glass of these globes and shades had to be made semi-transparent to a certain extent or degree, which quality or property of course essentially decreased the brightness of the light dispersed through these globes and shades. If the enameled or milk glass was manufactured more transparent—that is to say, to such a degree or extent that it would more readily allow the light to pass or penetrate—this advantage would be balanced by the defect that the body of the flame behind such shade or within such globe would become visible, which should by all means be avoided.

Now, for attaining the advantage of the utmost penetration or perviousness of the light through the enameled glass globe or shade, and at the same time avoiding the visibility of the flame itself through the enamel glass globe or shade, is the object of my invention.

According to this invention, I proceed in the following manner: I manufacture said globes and shades of such quality of milk or enameled glass that the flame within or behind said globe or shade becomes visible through the glass, and I then obscure or blind the inner surface of such shade or globe by any known process—such as grinding, etching, or roughing by sand-blast. I may blind or obscure either the entire surface of the shade or globe, or only that part by which the light is transmitted in a downward direction, as in the elevated position in which gas or petroleum lamps are generally situated the upper part or half of the globe may be left in its original condition—that is to say, not obscured or blinded. I prefer the use of feldspar and fluor-spar in manufacturing this glass in order to give it the enameled or milk glass quality, by which substances the enameled or milk glass does not obtain such non-transparent quality as if such glasses were manufactured with cryolite. I prefer to impart such non-transparency by blinding or obscuring the inner surface of said globes and shades, either on the entire inner surface or only on the lower part of it. The globes and shades manufactured in such manner will perfectly hide the frame itself within or behind such globe or shade; but they will allow the light to be dispersed or to pass through to a far greater extent than by the heretofore manufactured globes or shades.

I claim as my invention—

A globe or shade for a light, composed of opalescent glass that will allow the flame to be visible through it, and having the whole or a portion of the inner surface obscured, so as to render the flame invisible, but at the same time allow the light to pass through, substantially as specified.

Signed by me this 4th day of June, A. D. 1884.

ERNST FRANZ WILHELM HIRSCH.

Witnesses:
 EMIL SCHMIDT,
 OTTO CRIENITZ.